(12) United States Patent
Park

(10) Patent No.: US 7,847,994 B2
(45) Date of Patent: Dec. 7, 2010

(54) LIGHT SCANNING SYSTEM AND IMAGE FORMING APPARATUS

(75) Inventor: Gi-sung Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 35 days.

(21) Appl. No.: 11/947,026

(22) Filed: Nov. 29, 2007

(65) Prior Publication Data

US 2009/0002793 A1 Jan. 1, 2009

(30) Foreign Application Priority Data

Jun. 27, 2007 (KR) .................. 10-2007-0063814

(51) Int. Cl.
*G02B 26/08* (2006.01)

(52) U.S. Cl. ............... 359/204.1; 359/206.1; 347/244; 347/259

(58) Field of Classification Search ........... 359/204, 359/206, 662, 206.1, 204.1–204.5; 347/233, 347/241–244, 256–261
See application file for complete search history.

(56) References Cited

U.S. PATENT DOCUMENTS

| 5,111,219 | A  | * | 5/1992 | Makino ................. 347/259 |
| 5,812,181 | A  | * | 9/1998 | Ishibe ................. 347/258 |
| 6,801,239 | B2 |   | 10/2004 | Nakahata |
| 7,034,859 | B2 | * | 4/2006 | Ishihara et al. ........... 347/244 |
| 2003/0048516 | A1 | * | 3/2003 | Tokunaga ............... 359/205 |

FOREIGN PATENT DOCUMENTS

JP    2004-21133    1/2004

* cited by examiner

*Primary Examiner*—James Phan
(74) *Attorney, Agent, or Firm*—Staas & Halsey LLP

(57) ABSTRACT

A light scanning system and an image forming apparatus including the same, the light scanning system including: one or more light sources to emit light; a deflector to deflect the emitted light; and one or more f-θ lenses to focus the deflected light onto a photosensitive medium, wherein the light emitted by the one or more light sources is obliquely incident on a plane perpendicular to a rotational axis of the deflector, and the f-θ lens satisfies −0.5<R1/R2<0.2, where R1 is a curvature radius of an entrance surface of the respective f-θ lens in a main-scanning direction and R2 is a curvature radius of an exit surface of the respective f-θ lens in the main-scanning direction.

12 Claims, 10 Drawing Sheets

LIGHT SCANNING SYSTEM AND IMAGE FORMING APPARATUS

CROSS-REFERENCE TO RELATED APPLICATION

This application claims the benefit of Korean Application No. 2007-63814, filed on Jun. 27, 2007 in the Korean Intellectual Property Office, the disclosure of which is incorporated herein by reference.

BACKGROUND OF THE INVENTION

1. Field of the Invention

Aspects of the present invention relate to a light scanning system and an image forming apparatus including the same, and more particularly, to a light scanning system including a small optical system having improved curvature characteristics and an image forming apparatus including the light scanning system.

2. Description of the Related Art

One or more light scanning systems are used in an image forming apparatus (e.g., a laser printer) to form an electrostatic latent image by scanning a laser beam onto a photosensitive medium of the laser printer. Since a black and white laser printer transfers only black ink droplets onto paper, only one organic photoconductive (OPC) drum is required. In contrast, since a color laser printer transfers black, magenta, yellow, and cyan ink droplets onto paper, four light scanning systems and four OPC drums are required. The light scanning system greatly affects the manufacturing cost and image quality of a color laser printer. Accordingly, the number of components used in the light scanning system should be reduced to lower the manufacturing cost of the color laser printer, and the optical performance of the light scanning system should be improved to increase printing quality. In particular, the manufacturing cost of the image forming apparatus can be reduced by employing only one deflector. One deflector used in a color image forming apparatus may scan a plurality of light beams onto photosensitive members corresponding to a plurality of colors in two ways.

FIG. 1 is a cross-sectional view of a light scanning system 9 disclosed in Japanese Patent Laid-open No. 2004-021133. Referring to FIG. 1, the light scanning system 9 projects a plurality of parallel light beams E1, E2, E3, and E4 at different heights in a sub-scanning direction to a deflection surface of a deflector 4. Then, the light beams E1, E2, E3, and E4 are imaged onto corresponding photosensitive drums 1. A plurality of mirrors 7a, 7b, and 7c, and f-θ lenses 5 and 6 are disposed in optical paths between the deflector 4 and the photosensitive drums 1 in order to direct the light beams E1, E2, E3, and E4 to the corresponding photosensitive drums 1. However, since the light beams E1, E2, E3, and E4 are directed at different heights, the deflector 4 has an increased thickness and the f-θ lenses 5 and 6 have larger effective surfaces, thereby making it difficult to manufacture the light scanning system 9 compactly.

FIG. 2 is a cross-sectional view of another light scanning system disclosed in Japanese Patent Laid-open No. 2004-021133. Referring to FIG. 2, a plurality of light beams E1, E2, E3, and E4 are obliquely incident on a deflection surface of a deflector 4. However, in this case, scan lines are curved on objects onto which the light beams E1, E2, E3, and E4 are scanned. To reduce and correct the curvature of the scan lines, two or more f-θ lenses 13 and 14 are disposed in each optical path. Also, since a plurality of reflective mirrors 12a, 12b, and 12c are disposed between the f-θ lenses 13 and 14 and photosensitive drums, the scan lines may be skewed when the reflective mirrors 12a, 12b, and 12c are assembled.

SUMMARY OF THE INVENTION

Aspects of the present invention provide a light scanning system having desired scan line curvature characteristics in which light beams are obliquely incident on a plane perpendicular to the rotational axis of a deflector, and an image forming apparatus including the light scanning system.

According to an aspect of the present invention, there is provided a light scanning system including: one or more light sources to emit light; a deflector to deflect the emitted light; and one or more f-θ lenses to focus the deflected light onto a photosensitive medium, wherein the light emitted by the one or more light sources is obliquely incident on a plane perpendicular to a rotational axis of the deflector, and each f-θ lens satisfies $-0.5 < R1/R2 < 0.2$, where $R1$ is a curvature radius of an entrance surface of the respective f-θ lens in a main-scanning direction and $R2$ is a curvature radius of an exit surface of the respective f-θ lens in the main-scanning direction.

According to another aspect of the present invention, the one or more light sources may be a plurality of light sources, and the deflector may be shared by the plurality of light sources.

According to another aspect of the present invention, the one or more f-θ lenses may be respectively disposed in optical paths between the plurality of light sources and a plurality of photosensitive media corresponding to the light sources.

According to another aspect of the present invention, the light scanning system may further include a plurality of reflective mirrors to reflect the light, wherein at least one reflective mirror may be provided in an optical path between the deflector and each f-θ lens, and no reflective mirrors may be provided in optical paths between the one or more f-θ lenses and the plurality of photosensitive media.

According to another aspect of the present invention, the plurality of reflective mirrors may include a first reflective mirror to reflect the deflected light and a second reflective mirror to reflect the light reflected by the first reflective mirror to a corresponding f-θ lens, and the light deflected by the deflector and the light reflected by the second reflective mirror may intersect each other.

According to another aspect of the present invention, the first reflective mirror and the second reflective mirror may be provided between the deflector and the f-θ lens closest to the deflector.

According to another aspect of the present invention, the at least one reflective mirror provided between the deflector and the f-θ lens closest to the deflector may include a first reflective mirror to reflect the light deflected by the deflector and a second reflective mirror to reflect the light reflected by the first reflective mirror to a corresponding f-θ lens, and the light reflected by the deflector and the light reflected by the second reflective mirror may not intersect each other.

According to another aspect of the present invention, each f-θ lens may have a field curvature of less than 1 mm in the main-scanning direction and a curvature of less than 1 mm in a sub-scanning direction.

According to another aspect of the present invention, each f-θ lens may be eccentric with respect to the optical axis of the deflector.

According to another aspect of the present invention, there is provided an image forming apparatus including: a photosensitive medium on which an electrostatic latent image is formed; a developing unit to develop the electrostatic latent image; a transfer unit to transfer the electrostatic latent image developed by the developing unit; and a light scanning system including: one or more light sources to emit light; a deflector to deflect the emitted light; and one or more f-θ lenses to focus the light deflected by the deflector onto the photosensitive medium, wherein the light emitted by the light source is obliquely incident on a plane perpendicular to the rotational axis of the deflector, and each f-θ lens satisfies −0.5<R1/R2<0.2, where R1 is a curvature radius of an entrance surface of the respective f-θ lens in a main-scanning direction and R2 is a curvature radius of an exit surface of the respective f-θ lens in the main-scanning direction.

According to another aspect of the present invention, there is provided a method of focusing light onto a photosensitive medium in a light scanning system, the method including: emitting light from one or more light sources; deflecting, with a deflector, the emitted light to one or more f-θ lenses, the emitted light being obliquely incident on a plane perpendicular to a rotational axis of the deflector; and focusing the deflected light with the one or more f-θ lenses onto the photosensitive medium, each f-θ lens satisfying −0.5<R1/R2<0.2, where R1 is a curvature radius of an entrance surface of the respective f-θ lens in a main-scanning direction and R2 is a curvature radius of an exit surface of the respective f-θ lens in the main-scanning direction.

According to another aspect of the present invention, there is provided a light scanning system of an image forming apparatus that focuses light onto a photosensitive medium, the light scanning system including: a deflector to deflect light; and an f-θ lens to focus the deflected light onto the photosensitive medium, wherein the f-θ lens satisfies −0.5<R1/R2<0.2, where R1 is a curvature radius of an entrance surface of the respective f-θ lens in a main-scanning direction and R2 is a curvature radius of an exit surface of the respective f-θ lens in the main-scanning direction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
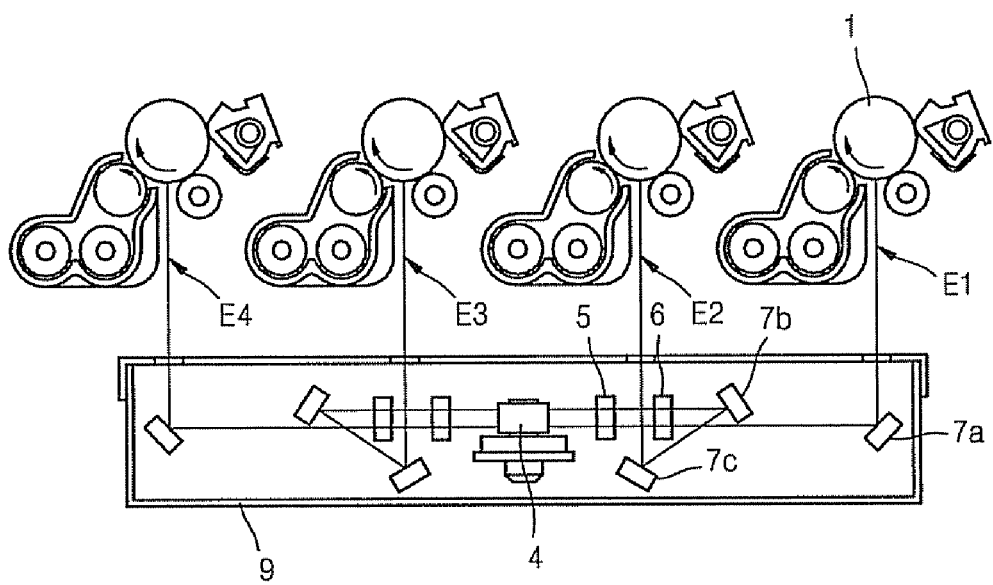
FIG. 1 is a cross-sectional view of an image forming apparatus disclosed in Japanese Patent Laid-open No. 2004-021133.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
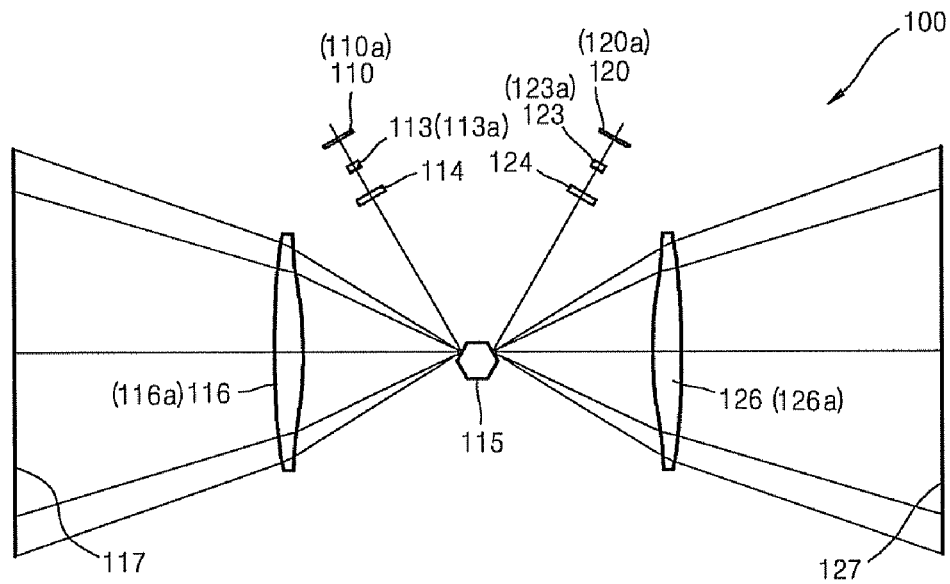
FIG. 3 illustrates a light scanning system arranged in a main-scanning direction according to an embodiment of the present invention.
Figure 4A:
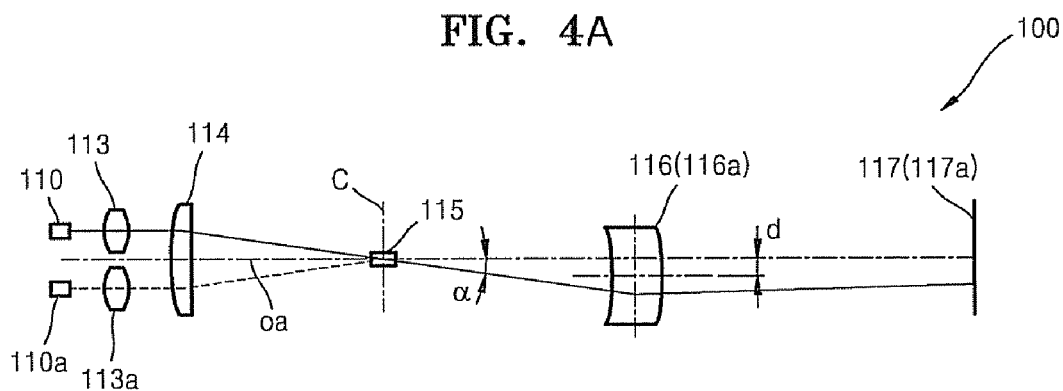
FIGS. 4A and 4B illustrate the light scanning system of FIG. 3 arranged in a sub-scanning direction according to another embodiment of the present invention.
Figure 4B:
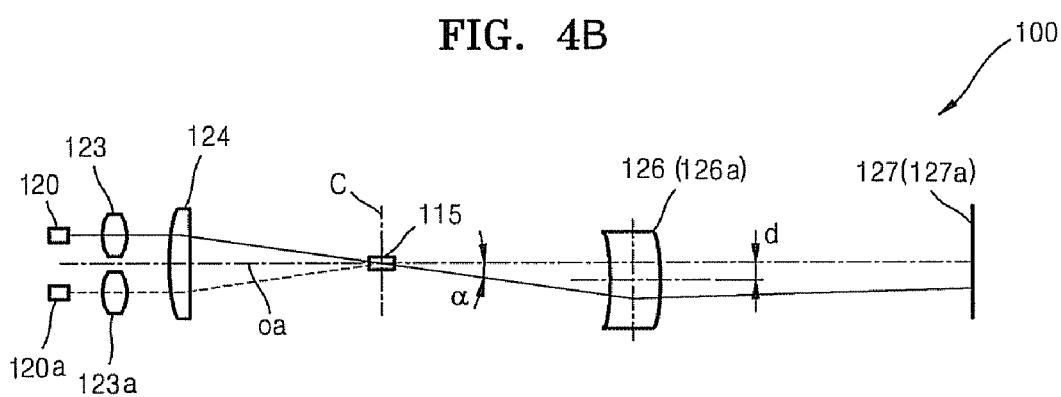

FIGS. 3, 4A, and 4B illustrate a light scanning system 100 arranged in a main-scanning direction (FIG. 3) and a sub-scanning direction (FIGS. 4A and 4B). The light scanning system 100 includes at least one light source 110, 110a, 120, and 120a, a deflector 115 to deflect light emitted by the at least one light source 110, 110a, 120, and 120a, and at least one f-θ lens 116, 116a, 126, and 126a to focus light reflected by the deflector 115. The at least one light source 110, 110a, 120, and 120a may include a plurality of light sources 110, 110a, 120, and 120a to form a color image, but can be a single light source in other aspects. Referring to FIGS. 3, 4A, and 4B, the light scanning system 100 includes first through fourth light sources 110, 110a, 120, and 120a, a deflector 115 to deflect light emitted by the first through fourth light sources 110, 110a, 120, and 120a, and first through fourth f-θ lenses 116, 116a, 126, and 126a to focus the light reflected by the deflector 115 on first through fourth photosensitive media 117, 117a, 127, and 127a. The first through fourth light sources 110, 110a, 120, and 120a emit light in different directions to the deflector 115, and the deflector 115 is commonly used with the first through fourth light sources 110, 110a, 120, and 120a. The first through fourth f-θ lenses 116, 116a, 126, and 126a are respectively disposed in optical paths between the deflector 115 and the photosensitive media 117a, 117a, 127, and 127a. It is understood that more or less than four light sources 110, 110a, 120, and 120a, photosensitive media 117, 117a, 127, and 127a, and f-θ lenses 116, 116a, 126, and 126a may be used according to aspects of the present invention.

The light scanning system 100 further includes first through fourth collimating lenses 113, 113a, 123, and 123a to respectively collimate light emitted by the light sources 110, 110a, 120, and 120a, a first cylindrical lens 114 to focus light passing through the first and second collimating lenses 113 and 113a on the deflector 115, and a second cylindrical lens 124 to focus light passing through the third and fourth collimating lenses 123 and 123a on the deflector 115. The first through fourth collimating lenses 113, 113a, 123, and 123a, the first cylindrical lens 114, and the second cylindrical lens 124 are disposed on optical paths between the deflector 115 and the light sources 110, 110a, 120, and 120a. The first cylindrical lens 114 may be shared by the first and second light sources 110 and 110a, and the second cylindrical lens 124 may be shared by the third and fourth light sources 120 and 120a. Alternatively, each light source may be provided with one cylindrical lens. An aperture stop (not shown) adjusting the diameter of light may be further provided between each collimating lens 113, 113a, 123, and 123a and corresponding cylindrical lens 114 and 124.

Light emitted by the first through fourth light sources 110, 110a, 120, and 120a is obliquely incident at a predetermined angle on a plane perpendicular to the rotational axis c of the deflector 115. For example, light emitted by the first light source 110 is downwardly incident on the deflector 115. Light emitted by the second light source 110a is upwardly incident on the deflector 115. Light emitted by the third light source 120 is downwardly incident on the deflector 115. Light emitted by the fourth light source 120a is upwardly incident on the deflector 115. Here, the incident angle α of light incident from the first through fourth light sources 110, 110a, 120, and 120a may be in a range of $0 \leq \alpha \leq 10°$.

The light downwardly incident on the deflector 115 passes below the optical axis of the first f-θ lens 116, and the optical axis of the first f-θ lens 116 is eccentric to the optical axis of the deflector 115. Specifically, the optical axis of the first f-θ lens 116 is lower by a distance d than the optical axis of the deflector 115. The second f-θ lens 116a is disposed in a different optical path from that of the first f-θ lens 116. The light upwardly incident on the deflector 115 passes above the optical axis of the second f-θ lens 116a, and the optical axis of the second f-θ lens 116a is eccentric to the optical axis of the deflector 115. Specifically, the optical axis of the second f-θ lens 116a is higher than the optical axis of the deflector 115 possibly, by an amount d. Since the first and second f-θ lenses 116 and 116a are eccentric in the sub-scanning direction, a difference in the size of an effective surface between an entrance surface and an exit surface of each of the first and second f-θ lenses 116 and 116a can be reduced, thereby reducing the thickness of the light scanning system 100 in the sub-scanning direction. Although only the first and second f-θ lenses 116 and 116a are shown in FIG. 4A, the third and fourth f-θ lenses 126 and 126a may be eccentric by the same amount as the first and second f-θ lenses 116 and 116a (as shown in FIG. 4B).

Figure 5:
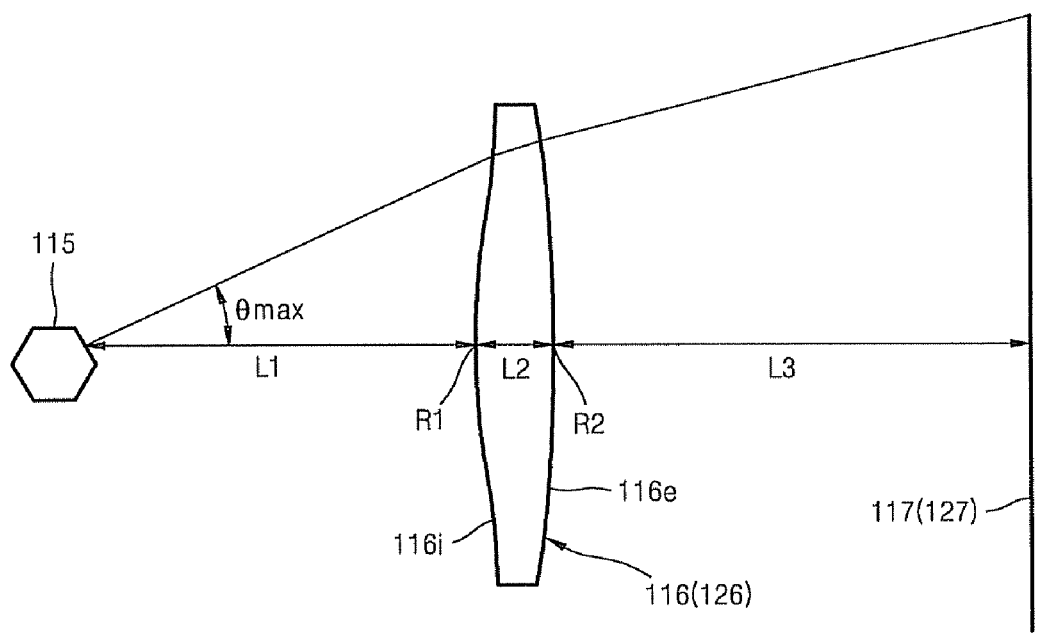
FIG. 5 illustrates an f-θ lens arranged in the light scanning system of FIG. 3 in the main-scanning direction according to an embodiment of the present invention.
Figure 6:
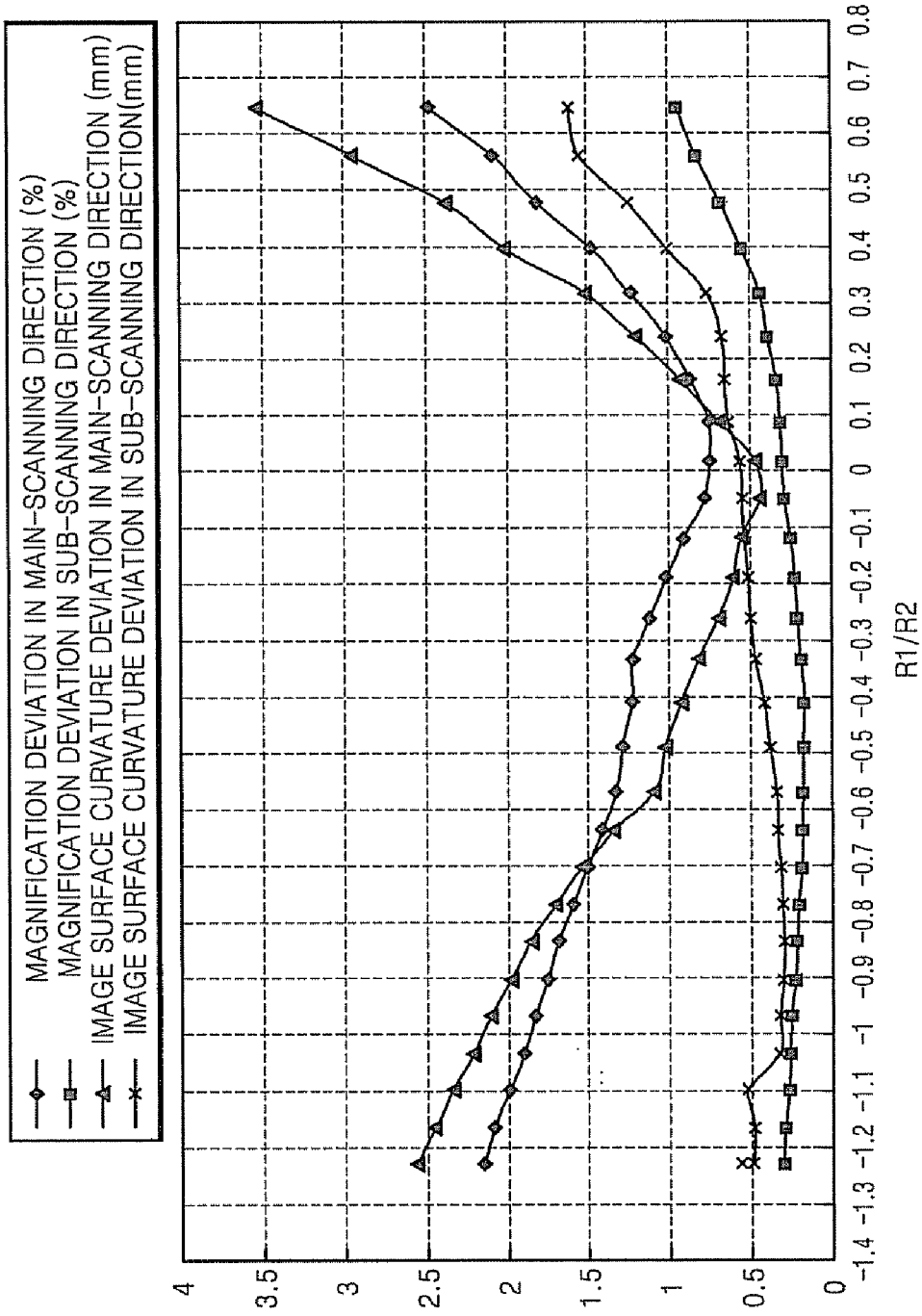
FIG. 6 is a graph illustrating a relationship between optical characteristics and a ratio of the curvature radius of an entrance surface to the curvature radius of an exit surface in a main-scanning direction of an f-θ lens on an optical axis.

FIG. 5 illustrates the deflector 115 and the f-θ lenses 116 and 126 of the light scanning system of FIG. 3 in the main-scanning direction. In FIG. 5, $\Theta max$ denotes an effective maximum viewing angle, L1 denotes a distance between the deflector 115 and an entrance surface 116i of the f-θ lens 116, L2 denotes the center thickness of the f-θ lens 116, and L3 denotes a distance between an exit surface 116e of the f-θ lens and the photosensitive medium 117 or 127. Furthermore, R1 denotes the curvature radius of the entrance surface 116i in the main-scanning direction and R2 denotes the curvature radius of the exit surface 116e in the main-scanning direction. FIG. 6 is a graph illustrating a relationship between the ratio R1/R2 and a field curvature deviation (mm) in the main-scanning direction, a field curvature deviation (mm) in the sub-scanning direction, a magnification deviation (%) in the main-scanning direction, and a magnification deviation (%) in the sub-scanning direction. In FIG. 5, the effective maximum view angle $\Theta max$ is 32 degrees. However, it is understood that the effective maximum view angle $\Theta max$ is not limited to 32 degrees in all embodiments of the present invention. The ratio R1/R2 of the f-θ lens 116 of the light scanning system satisfies the equation 1:

$$-0.5 < R1/R2 < 0.2.$$

When the ratio R1/R2 satisfies the equation 1, each of the field curvature deviation in the main-scanning direction and the field curvature deviation in the sub-scanning direction is less than 1 mm, the magnification deviation in the main-scanning direction is less than 1.5%, and the magnification deviation in the sub-scanning direction is less than 1%. Accordingly, the light scanning system 100 has desired field curvature deviations in the main-scanning direction and in the sub-scanning system and magnification deviations in the main-scanning direction and in the sub-scanning direction.

The aspheric shapes of the entrance surface 116i and the exit surface 116e of the f-θ lens 116, 116a, 126, or 126a may be expressed by the following equation 2:

$$z = \frac{y^2}{R\left(1 + \sqrt{1 - (K+1)(y/R)^2}\right)} + \sum_n a_n |y|^n + \frac{x^2}{r\left(1 + \sqrt{1 - (x/r)^2}\right)} + \sum_{m,n} e_{mn} |y|^m \mid;$$

where the optical axis is the Z-axis, the sub-scanning direction is the X-axis, the main-scanning direction is the Y-axis, z denotes a distance from the vertex of the lens in the optical axis, x denotes a distance in the direction perpendicular to the optical axis, y denotes a distance from the vertex of the lens in the main-scanning direction, K denotes a conic constant, $a_n$ denotes an aspheric coefficient in the main-scanning direction, R denotes a curvature radius in the main-scanning direction, r denotes a curvature radius in the sub-scanning direction, and $e_{mn}$ denotes an aspheric coefficient in the sub-scanning direction.

Detailed design data for examples of the light scanning system 100 are as follows:

EXAMPLE 1

TABLE 1

| Construction of light scanning system | | |
|---|---|---|
| Effective maximum view angle [deg] | $\theta_{max}$ | 32 |
| Effective swath width [mm] | W | 216 |
| Oblique incident angle [deg] | α | 3 |
| Wavelength of light [nm] | λ | 780 |
| Refractive index of f-θ lens | N | 1.527 |

TABLE 2

| Arrangement of image forming optical system [mm] | | |
|---|---|---|
| Deflection surface of deflector~entrance surface of f-θ lens | L1 | 85 |
| Entrance surface of f-θ lens~exit surface of f-θ lens | L2 | 15 |
| Exit surface of f-θ lens~photosensitive medium | L3 | 137 |

TABLE 3

|  |  | Entrance surface of f-θ lens | Exit surface of f-θ lens |
|---|---|---|---|
| R |  | 176.55752 | −6970.45027 |
| Light source side | a4 | −8.765E−07 | −7.506E−07 |
|  | a6 | 3.195E−10 | 2.132E−10 |
|  | a8 | −6.122E−14 | −2.264E−14 |
|  | a10 | 2.701E−18 | −2.033E−18 |
| Side opposite to light source side | a4 | −7.373E−07 | −6.090E−07 |
|  | a6 | 2.320E−10 | 1.430E−10 |
|  | a8 | −4.133E−14 | −1.213E−14 |
|  | a10 | 1.632E−18 | −1.792E−18 |
| r |  | 2.772E+02 | −3.659E+01 |
| Light source side | e02 | −3.318E−03 | −2.959E−03 |
|  | e22 | 3.879E−06 | 3.343E−06 |
|  | e42 | −3.729E−09 | −1.957E−09 |
|  | e62 | 1.917E−12 | 5.334E−13 |
|  | e82 | −3.453E−16 | 9.905E−17 |
|  | e102 | 8.945E−21 | −3.977E−20 |
|  | e04 | −1.539E−04 | −1.087E−04 |
|  | e24 | −6.463E−09 | −1.316E−08 |
|  | e44 | 7.297E−11 | 1.957E−11 |
|  | e64 | −3.420E−14 | 1.438E−15 |
|  | e84 | 4.907E−18 | −3.537E−18 |
|  | e104 | −6.306E−23 | 5.893E−22 |
| Side opposite to light source side | e02 | −3.318E−03 | −2.959E−03 |
|  | e22 | 4.168E−06 | 3.710E−06 |
|  | e42 | −2.945E−09 | −1.744E−09 |
|  | e62 | 1.361E−12 | 5.851E−13 |
|  | e82 | −2.293E−16 | −1.894E−17 |
|  | e102 | 1.282E−20 | −6.645E−21 |
|  | e04 | −1.539E−04 | −1.087E−04 |
|  | e24 | 4.824E−08 | 6.526E−09 |
|  | e44 | −1.875E−12 | 3.206E−12 |
|  | e64 | −7.472E−16 | 1.315E−15 |
|  | e84 | −9.171E−19 | −1.399E−18 |
|  | e104 | 2.388E−22 | 2.348E−22 |

In Table 3, an aspheric coefficient is divided into an aspheric coefficient on a light source side (i.e., closer to a light source) and an aspheric coefficient on a side opposite to the light source side (i.e., farther from the light source) about the central axis of an f-θ lens.

EXAMPLE 2

TABLE 4

| Construction of light scanning system | | |
|---|---|---|
| Effective maximum view angle [deg] | $\theta_{max}$ | 32 |
| Effective swath width [mm] | W | 216 |
| Oblique incident angle [deg] | α | 3 |
| Wavelength of light [nm] | λ | 780 |
| Refractive index of f-θ lens | N | 1.527 |

TABLE 5

| Arrangement of image forming optical system [mm] | | |
|---|---|---|
| Deflection surface of deflector~entrance surface of f-θ lens | L1 | 85 |
| Entrance surface of f-θ lens~exit surface of f-θ lens | L2 | 15 |
| Exit surface of f-θ lens~photosensitive medium | L3 | 138.7 |

TABLE 6

|  |  | Entrance surface of f-θ lens | Exit surface of f-θ lens |
|---|---|---|---|
| R |  | 184.676 | −1724.221 |
| Light source side | a4 | −6.558E−07 | −5.553E−07 |
|  | a6 | 1.972E−10 | 1.324E−10 |
|  | a8 | −3.327E−14 | −1.379E−14 |
|  | a10 | 1.651E−18 | −4.846E−19 |
| Side opposite to light source side | a4 | −6.624E−07 | −5.424E−07 |
|  | a6 | 1.817E−10 | 1.058E−10 |
|  | a8 | −2.671E−14 | −5.445E−15 |
|  | a10 | 1.033E−18 | −1.138E−18 |
| r |  | −84.896 | −29.353 |
| Light source side | e02 | 1.669E−03 | −1.688E−03 |
|  | e22 | 3.634E−06 | 2.793E−06 |
|  | e42 | −3.319E−09 | −1.653E−09 |
|  | e62 | 1.765E−12 | 4.666E−13 |
|  | e82 | −3.467E−16 | 6.985E−17 |
|  | e102 | 1.599E−20 | −2.904E−20 |
|  | e04 | −8.765E−05 | −4.280E−05 |
|  | e24 | −1.615E−08 | −1.372E−08 |
|  | e44 | 5.799E−11 | 1.363E−11 |
|  | e64 | −3.484E−14 | −3.091E−16 |
|  | e84 | 6.877E−18 | −3.060E−18 |
|  | e104 | −3.535E−22 | 5.958E−22 |
| Side opposite to light source side | e02 | 1.669E−03 | −1.688E−03 |
|  | e22 | 3.528E−06 | 2.818E−06 |
|  | e42 | −2.537E−09 | −1.357E−09 |
|  | e62 | 1.256E−12 | 3.914E−13 |
|  | e82 | −2.392E−16 | 3.466E−17 |
|  | e102 | 1.151E−20 | −1.782E−20 |
|  | e04 | −8.765E−05 | −4.280E−05 |
|  | e24 | 2.217E−08 | 6.833E−10 |
|  | e44 | −6.943E−12 | −2.210E−12 |
|  | e64 | −2.907E−16 | 8.787E−16 |
|  | e84 | 5.842E−20 | −7.705E−19 |
|  | e104 | 3.298E−23 | 1.242E−22 |

Figure 7A:
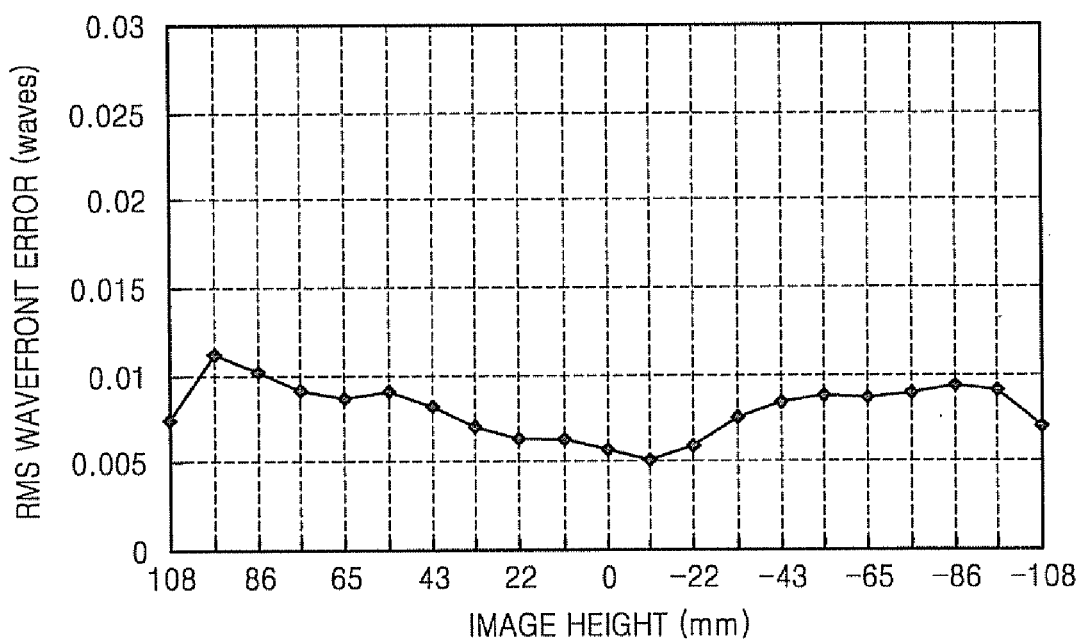
FIG. 7A is a graph illustrating a relationship between a root mean square (RMS) wavefront error and the image height of an f-θ lens of a light scanning system according to an embodiment of the present invention.

According to Example 1, R1/R2 is 0.025, thus satisfying equation 1 above. In order to improve the scan line curvature characteristics of a photosensitive medium 117 and 127 and reduce the effective size an entrance surface 116i and an exit surface 116e, the f-θ lens 116 and 126 should be eccentric in a sub-scanning direction to an optical axis. The eccentricity of the f-θ lens 116 and 126 to the optical axis may be, for example, 2.3 mm. FIG. 7A illustrates a relationship between image height and root mean square (RMS) wavefront error on a photosensitive medium 117 and 127 of a light scanning system 100 designed based on Example 1, when an F number in a main-scanning direction is 50 and an f number in a sub-scanning direction is 50. Referring to FIG. 7A, the RMS wavefront error is less than 0.02 waves with an average of 0.008 waves. The RMS wavefront error may be an optical factor determining the image forming performance of the f-θ lens 116 and 126.

Figure 7B:
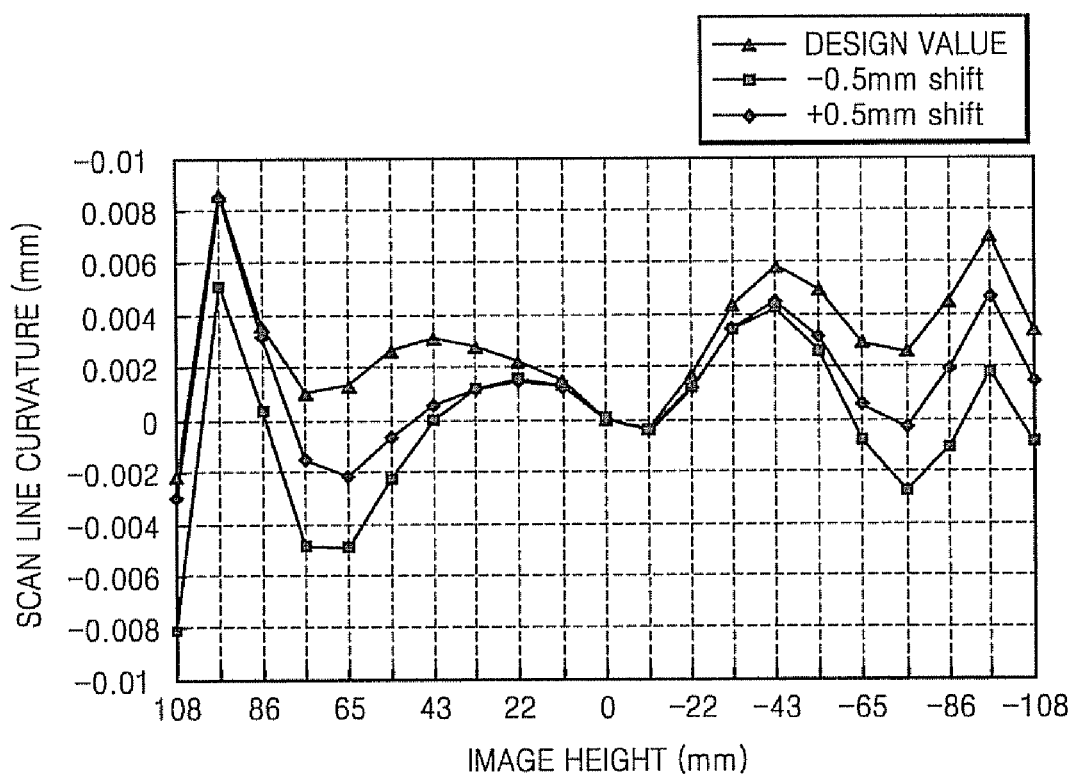
FIG. 7B is a graph illustrating a relationship between scan line curvature and the image height of the f-θ lens of the light scanning system of FIG. 7A.

FIG. 7B is a graph illustrating a relationship between scan line curvature and the image height of the f-θ lens 116 and 126 of the light scanning system 100 of FIG. 7A when the f-θ lens is shifted in the sub-scanning direction by −0.5 mm and +0.5 mm. Referring to FIG. 7B, scan line curvature deviations are 11, 13, and 11 μm, which are less than 20 μm. Since the light scanning system 100 of FIG. 7A has desired scan line curvature deviations when the f-θ lens 116 and 126 is shifted, the ease of assembly and mass production of the f-θ lens are improved. The scan line curvature deviations of less than 20 μm result in a deviation of less than 0.5 dots when a resolution is 600 dpi.

Figure 7C:
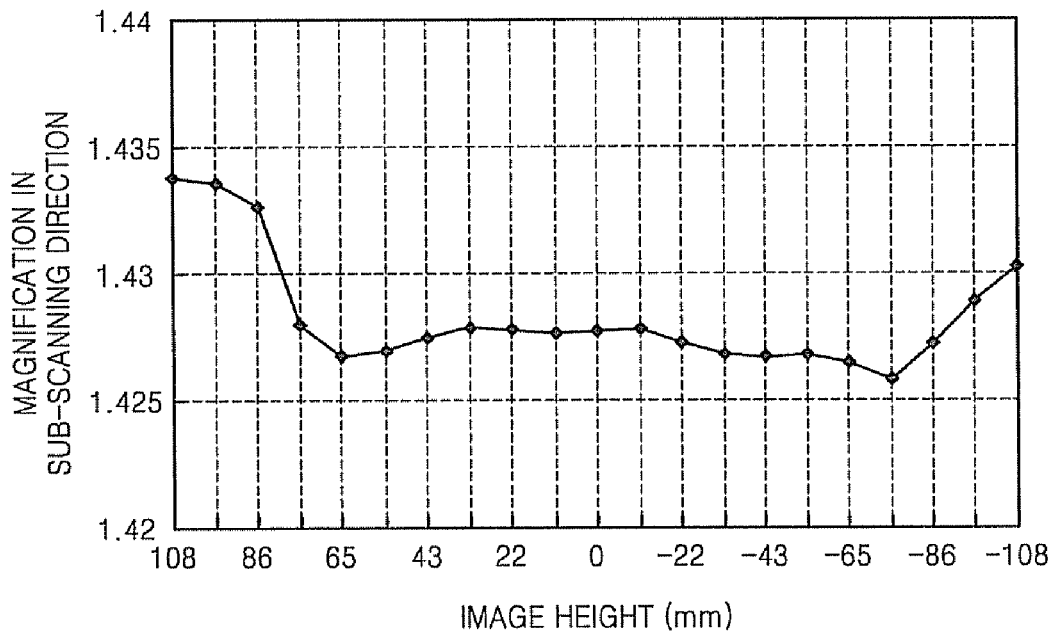
FIG. 7C is a graph illustrating a relationship between magnification in a sub-scanning direction and the image height of the f-θ lens of the light scanning system of FIG. 7A.

FIG. 7C is a graph illustrating a relationship between magnification in the sub-scanning direction and the image height of the f-θ lens 116 and 126 of the light scanning system 100 of FIG. 7A. Referring to FIG. 7C, a magnification deviation is approximately 0.55%. Since the light scanning system 100 has a desired magnification deviation, the degree of scan line curvature due to oblique incidence of light can be reduced to a small value.

Figure 8A:
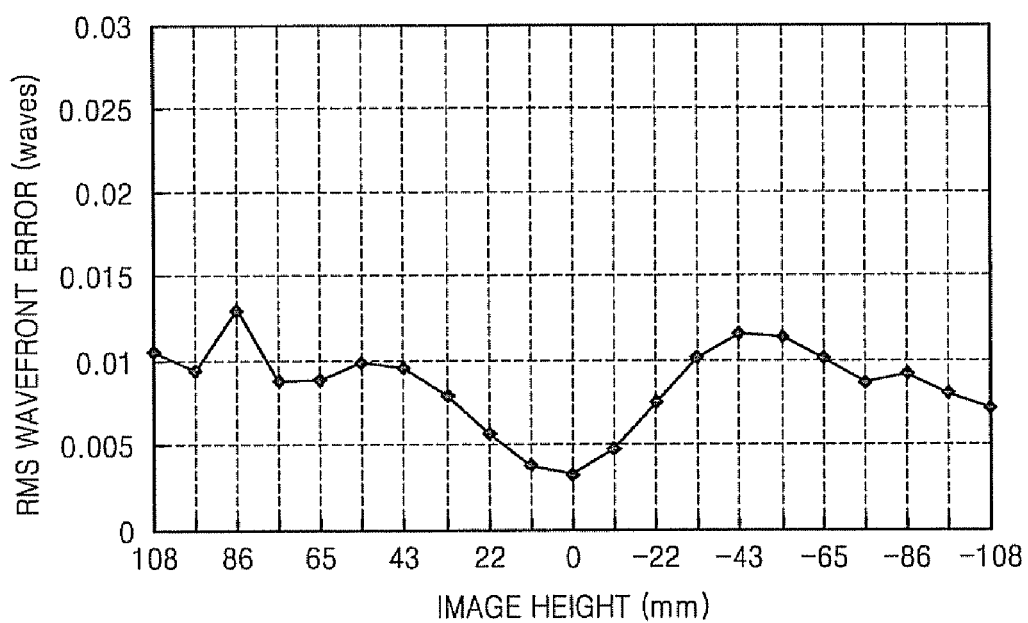
FIG. 8A is a graph illustrating a relationship between an RMS wavefront error and the image height of an f-θ lens of a light scanning system according to another embodiment of the present invention.

According to Example 2, R1/R2 is 0.107, thus satisfying equation 1 above. The eccentricity of an f-θ lens 116 and 126 in a sub-scanning direction is 2.04 mm. FIG. 8A illustrates a relationship between RMS wavefront error and the image height of the f-θ lens 116 and 126 employed in a light scanning system 100 designed based on Data for Second Embodiment, when an F number in a main-scanning direction is 50 and an f number in the sub-scanning direction is 50. Referring to FIG. 8A, the RMS wavefront error is less than 0.02 waves with an average of 0.0086. Accordingly, the light scanning system 100 of FIG. 8A has a good RMS wavefront error.

Figure 8B:
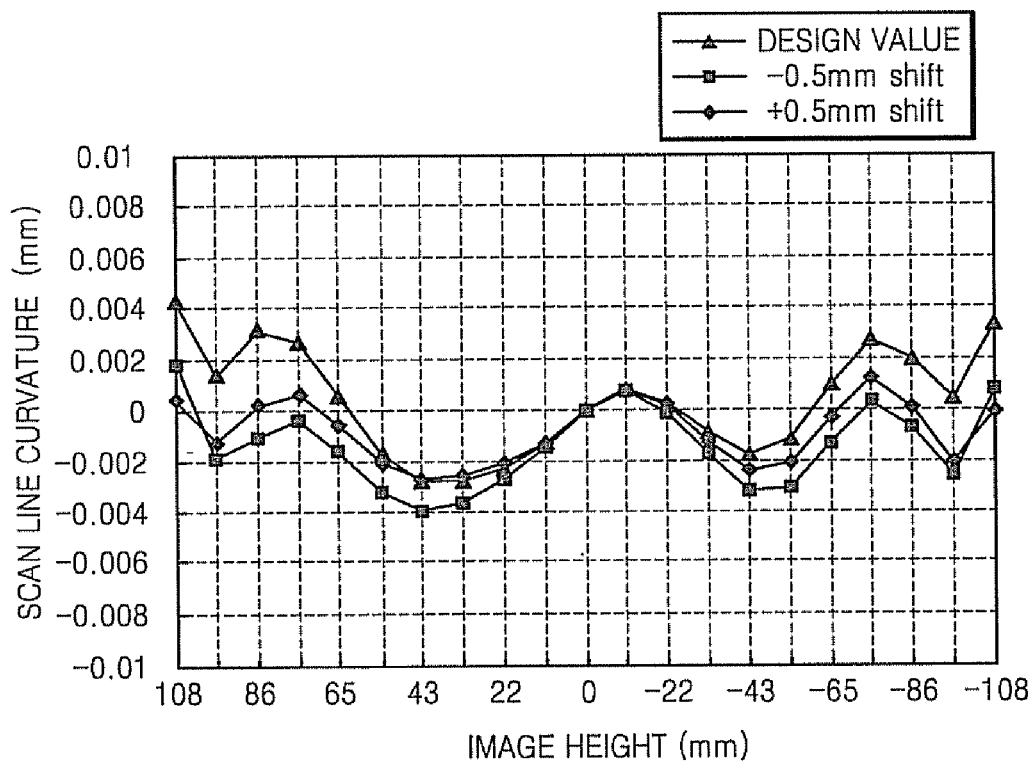
FIG. 8B is a graph illustrating a relationship between scan line curvature and the image height of the f-θ lens of the light scanning system of FIG. 8A.
Figure 8C:
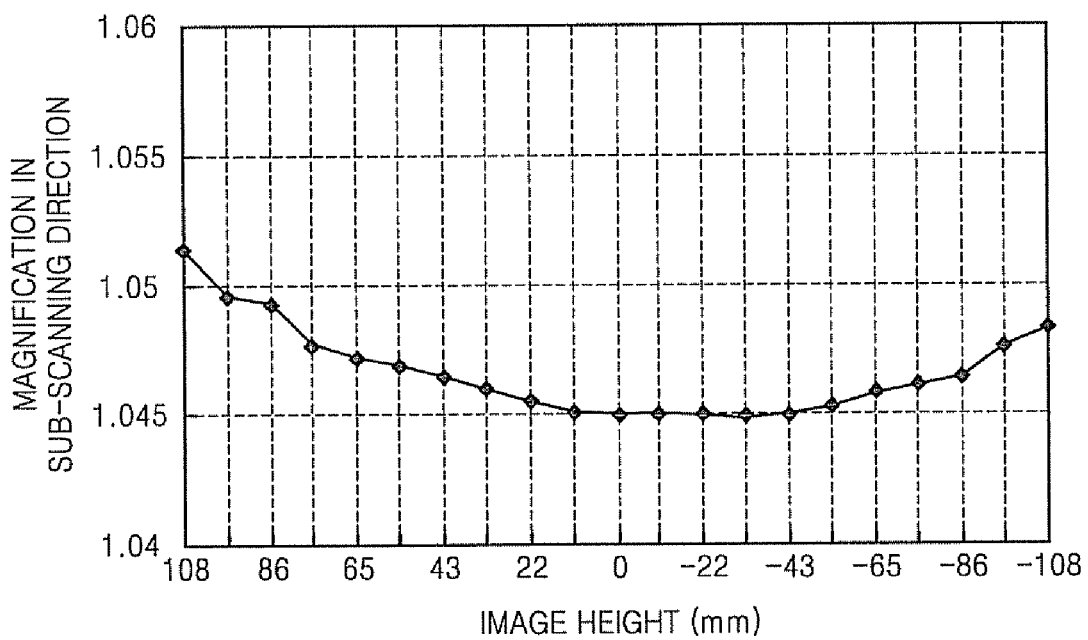
FIG. 8C is a graph illustrating a relationship between magnification in a sub-scanning direction and the image height of the f-θ lens of the light scanning system of FIG. 8A.

FIG. 8B is a graph illustrating a relationship between scan line curvature and the image height of the f-θ lens 116 and 126 of the light scanning system 100 of FIG. 8A when the f-θ lens 116 and 126 is shifted in the sub-scanning direction by −0.5 mm and +0.5 mm. Referring to FIG. 8B, scan line curvature deviations are 4, 6, and 7 μm, which are less than 20 μm. Accordingly, the light scanning system 100 of FIG. 8A has desired scan line curvature deviations. FIG. 8C is a graph illustrating a relationship between magnification in the sub-scanning direction and the image height of the f-θ lens 116 and 126 of the light scanning system 100 of FIG. 8A. Referring to FIG. 8C, a magnification deviation is approximately 0.62%. Accordingly, the light scanning system 100 has very good magnification deviation characteristics.

Figure 2:
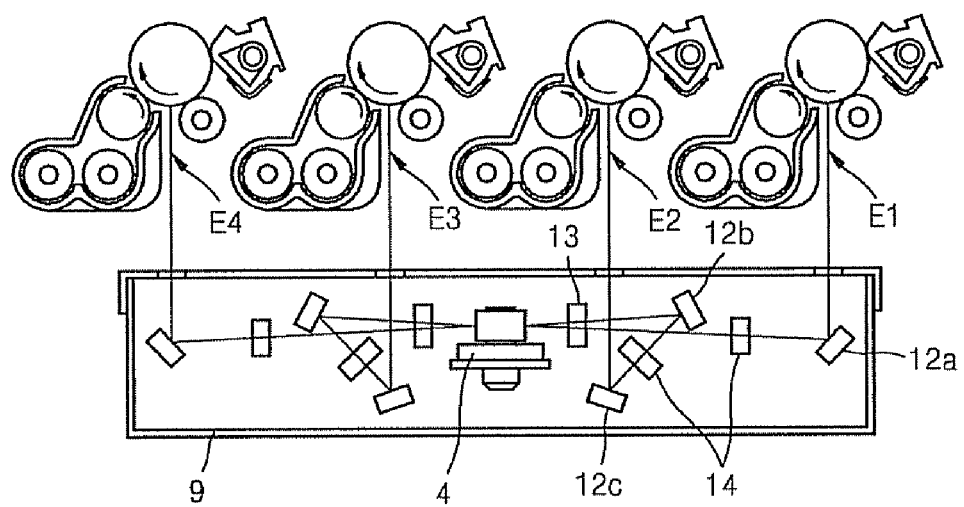
FIG. 2 is a cross-sectional view of another image forming apparatus disclosed in Japanese Patent Laid-open No. 2004-021133.
Figure 9:
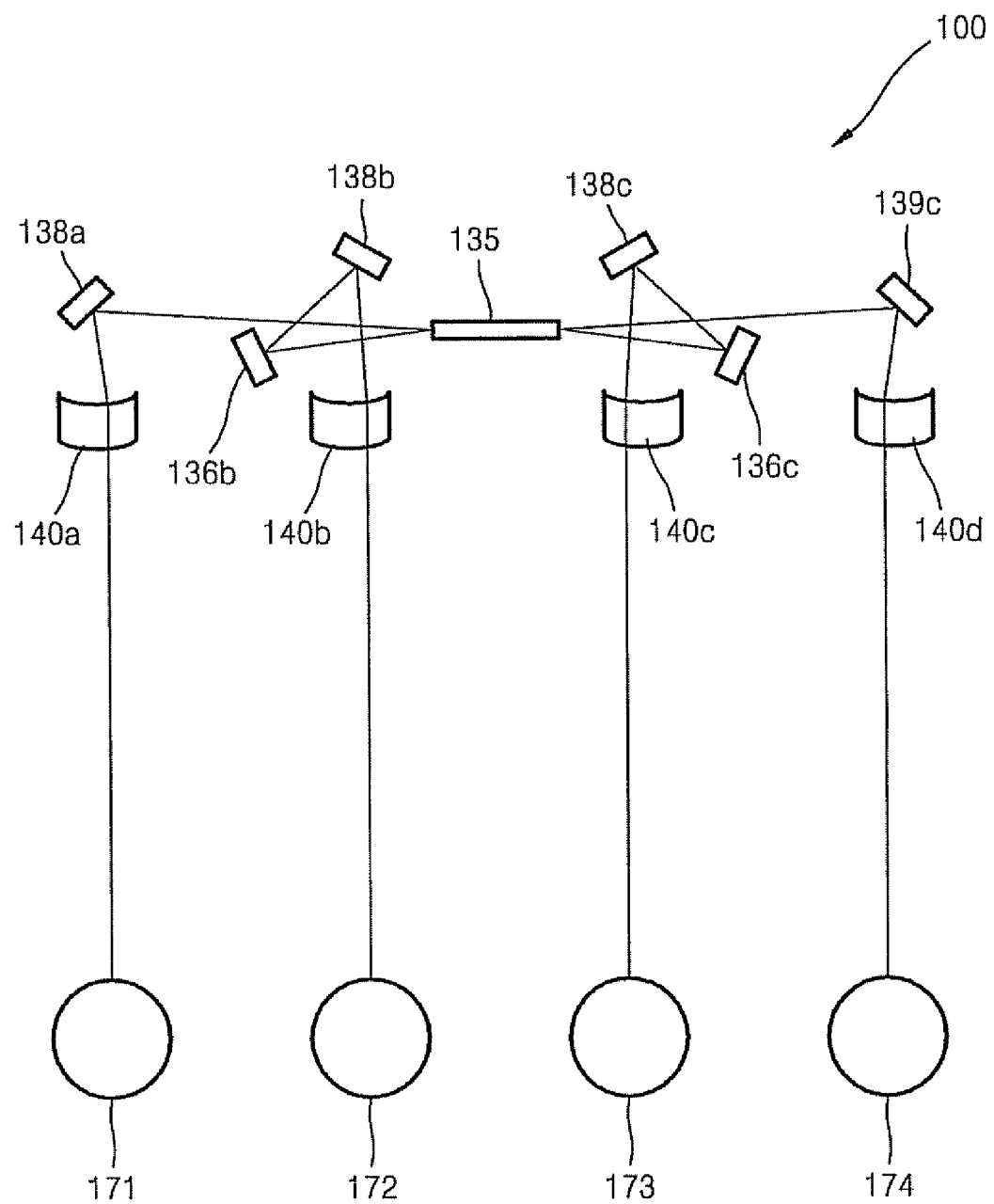
FIG. 9 illustrates a light scanning system arranged in a sub-scanning direction according to another embodiment of the present invention.

FIG. 9 illustrates a light scanning system 100 in a main-scanning direction according to another embodiment of the present invention. Referring to FIG. 9, the light scanning system 100 includes a deflector 135, first through fourth f-θ lenses 140a, 140b, 140c, and 140d, and a plurality of reflective mirrors 136b, 136c, 138a, 138b, 138c, and 139c. Light obliquely incident on the deflector 135 travels first through fourth optical paths and is imaged onto first through fourth photosensitive media 171, 172, 173, and 174. It is understood that more or less than four photosensitive media 171, 172, 173, and 174 may be used according to aspects of the present invention. The F-θ lenses 140a, 140b, 140c, and 140d are respectively disposed in the first through fourth optical paths. At least one reflective mirror 136b, 136c, 138a, 138b, 138c, and 139c is disposed between the deflector 135 and each of the f-θ lenses 140a, 140b, 140c, and 140d. No reflective mirror is disposed between the f-θ lenses 140a, 140b, 140c, and 140d and the photosensitive media 171, 172, 173, and 174 respectively corresponding to the f-θ lenses 140a, 140b, 140c, and 140d. Scan line curvature characteristics are improved by adjusting a ratio of the curvature radius of an entrance surface to the curvature radius of an exit surface of each of the f-θ lenses 140a, 140b, 140c, and 140d. Therefore, it is unnecessary for reflective mirrors for correcting scan line curvature to be disposed after the f-θ lenses 140a, 140b, 140c, and 140d. Since no reflective mirrors are disposed after the f-θ lenses 140a, 140b, 140c, and 140d, the light scanning system 100 of FIG. 9 can improve the ease of assembly of the f-θ lenses 140a, 140b, 140c, and 140d, unlike a light scanning system with a reflective mirror after an f-θ lens (as in FIG. 1 or FIG. 2) in which when the reflective mirror is moved during the assembly of the f-θ lens, scan line skew is caused and the movement of the f-θ lens is hampered.

Referring to FIG. 9, light reflected in a left upward direction by the deflector 135 is reflected by a first reflective mirror 138a to the first f-θ lens 140a and imaged onto the first photosensitive medium 171 by the first f-θ lens 140a. Similarly, light reflected in a left downward direction by the deflector 135 is reflected by a second reflective mirror 136a and a third reflective mirror 138b to the second f-θ lens 140b. The second reflective mirror 136a and the third reflective mirror 138b may be disposed so that an optical path between the deflector 135 and the second reflective mirror 136b and an optical path between the third reflective mirror 138b and the second f-θ lens 140b intersect each other. Light reflected by the third reflective mirror 138b to the second f-θ lens 140b is imaged onto the second photosensitive medium 172 by the second f-θ lens 140b.

Light reflected in a right downward direction by the deflector 135 is reflected by a fourth reflective mirror 136c and a fifth reflective mirror 138c to the third f-θ lens 140c. The fourth reflective mirror 136c and the fifth reflective mirror 138c may be disposed so that an optical path between the deflector 135 and the fourth reflective mirror 136c and an optical path between the fifth reflective mirror 138c and the third f-θ lens 140c intersect each other. For example, the second reflective mirror 136c reflecting light deflected by the deflector 135 and the third reflective mirror 138b reflecting light reflected by the second reflective mirror 136b to the second f-θ lens 140b are disposed between the deflector 135 and the second f-θ lens 140b closer to the deflector 135, such that a beam reflected by the deflector 135 and a beam reflected by the fifth reflective mirror 138c intersect each other. Also, a beam reflected by the deflector 135 and a beam reflected by the fifth reflective mirror 138c intersect each other. Light reflected by the fifth reflective mirror 138c to the third f-θ lens 140c is imaged onto the third photosensitive medium 173 by the third f-θ lens 140c. Light reflected in a right upward direction by the deflector 135 is reflected by a sixth reflective mirror 138d to the fourth f-θ lens 140d and is imaged onto the fourth photosensitive medium 174 by the fourth f-θ lens 140d.

The light scanning system 100 having the first through fourth optical paths may be disposed in a symmetric manner in the main-scanning direction with respect to the deflector 135. One reflective mirror 136b, 136c, 138a, 138b, 138c, or 139c may be disposed in an optical path of light reflected upwardly in a sub-scanning direction by the deflector 135, and two reflective mirrors 136b, 136c, 138a, 138b, 138c, or 139c may be disposed in an optical path of light reflected downwardly in the sub-scanning direction by the deflector 135. That is, reflective mirrors 136b, 136c, 138a, 138b, 138c, and 139c may be disposed so that a difference between the number of reflective mirrors disposed in the optical path of light reflected downwardly by the deflector 135 and the number of light reflected upwardly by the deflector 135 is one.

Figure 10:
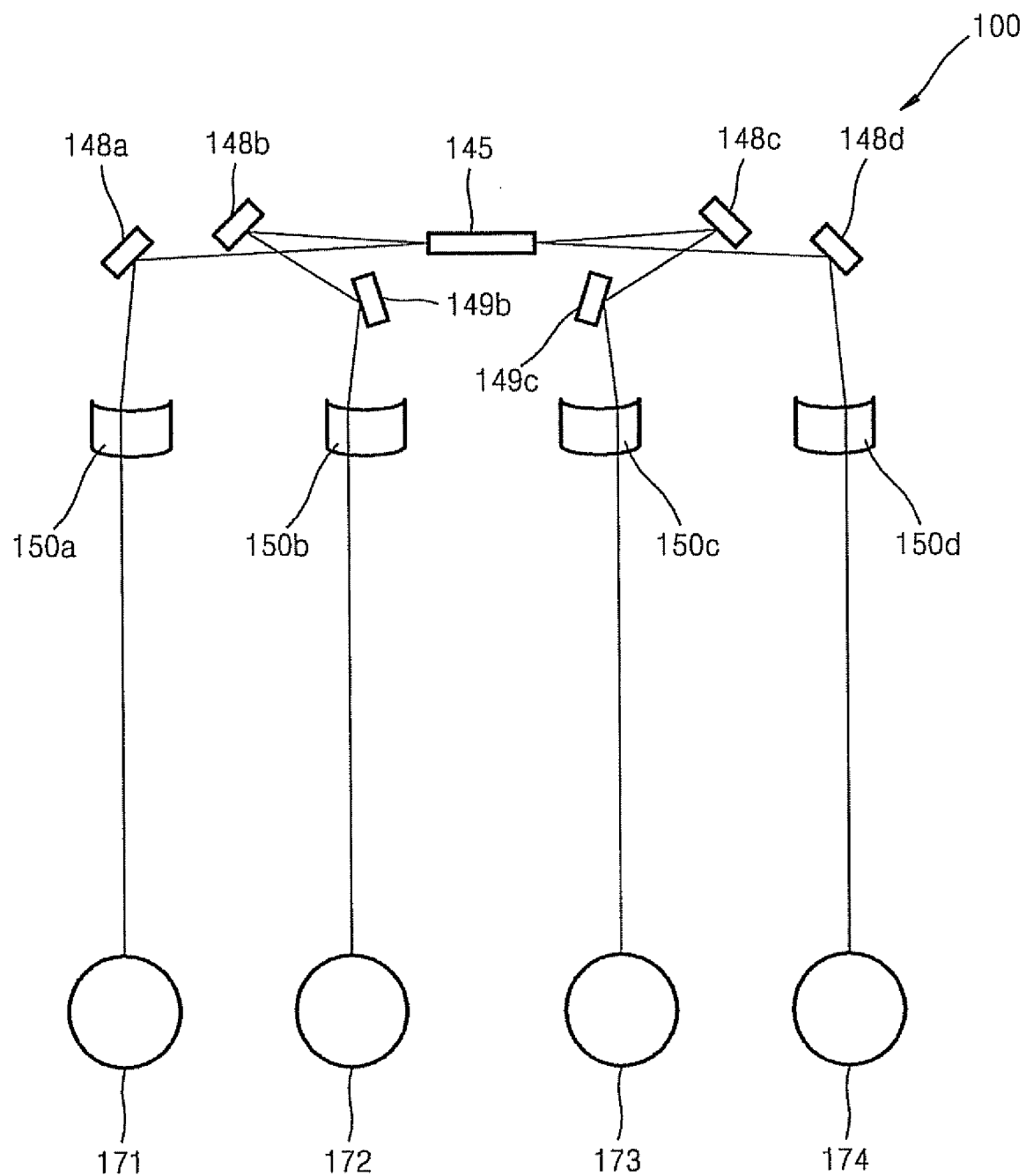
FIG. 10 illustrates a light scanning system arranged in a sub-scanning direction according to another embodiment of the present invention.

FIG. 10 illustrates a light scanning system 100 in a sub-scanning direction according to another embodiment of the present invention. Referring to FIG. 10, the light scanning system 100 includes a deflector 145, first through fourth f-θ lenses 150a, 150b, 150c, and 150d, and a plurality of reflective mirrors 148a, 148b, 148c, 148d, 149b, and 149c. One reflective mirror 148a, 148b, 148c, 148d, 149b, or 149c may be disposed in an optical path of light reflected downwardly in the sub-scanning direction by the deflector 145, and two reflective mirrors 148a, 148b, 148c, 148d, 149b, or 149c may be disposed in an optical path of light reflected upwardly in the sub-scanning direction by the deflector 145. In detail, referring to FIG. 10, a first reflective mirror 148a is disposed in an optical path of light reflected in a left downward direction by the deflector 145, and light reflected by the first reflective mirror 148a to a first f-θ lens 150a is imaged onto a first photosensitive medium 171. A second reflective mirror 148b and a third reflective mirror 149b are disposed in an optical path of light reflected in a left upward direction by the deflector 145 so that an optical path between the deflector 145 and the second reflective mirror 148b and an optical path between the third reflective mirror 149b and a second f-θ lens 150b do not intersect each other. In other words, a beam reflected by the deflector 145 and a beam reflected by the third reflective mirror 149b do not intersect each other, and a beam reflected by the deflector 145 and a beam reflected by a fifth reflective mirror 149c do not intersect each other.

Light reflected in a right upward direction by the deflector 145 is reflected by a fourth reflective mirror 148c and a fifth reflective mirror 149c to a third f-θ lens 150c, and the fourth reflective mirror 148c and the fifth reflective mirror 149c are disposed so that an optical path between the deflector 145 and the fourth reflective mirror 148c and the fifth reflective mirror 149c and the third f-θ lens 150c do not intersect each other. Light reflected in a right downward direction by the deflector 145 is reflected by a sixth reflective mirror 148d to a fourth f-θ lens 150d and is imaged onto a fourth photosensitive medium 174 by the fourth f-θ lens 150d. Accordingly, two mirrors are disposed between the deflector 145 and the second f-θ lens 150b closer to the deflector 145 and between the deflector 145 and the third f-θ lens 150c so that beams do not intersect each other. The reflective mirrors may be arranged in various ways according to a space where the light scanning system is installed.

Since no reflective mirrors are disposed between the first through fourth f-θ lenses 150a, 150b, 150c, and 150d and corresponding photosensitive media 171, 172, 173, and 174 and the first through fourth f-θ lenses 150a, 150b, 150c, and 150d satisfy equation 1 above, the light scanning systems 100 described above with reference to FIGS. 3 through 10 obtain desired scan lines. It is understood that, although the light scanning systems 100 in the above embodiments are used to obtain a color image, the light scanning systems 100 can be used to obtain a black and white image as well.

Figure 11:
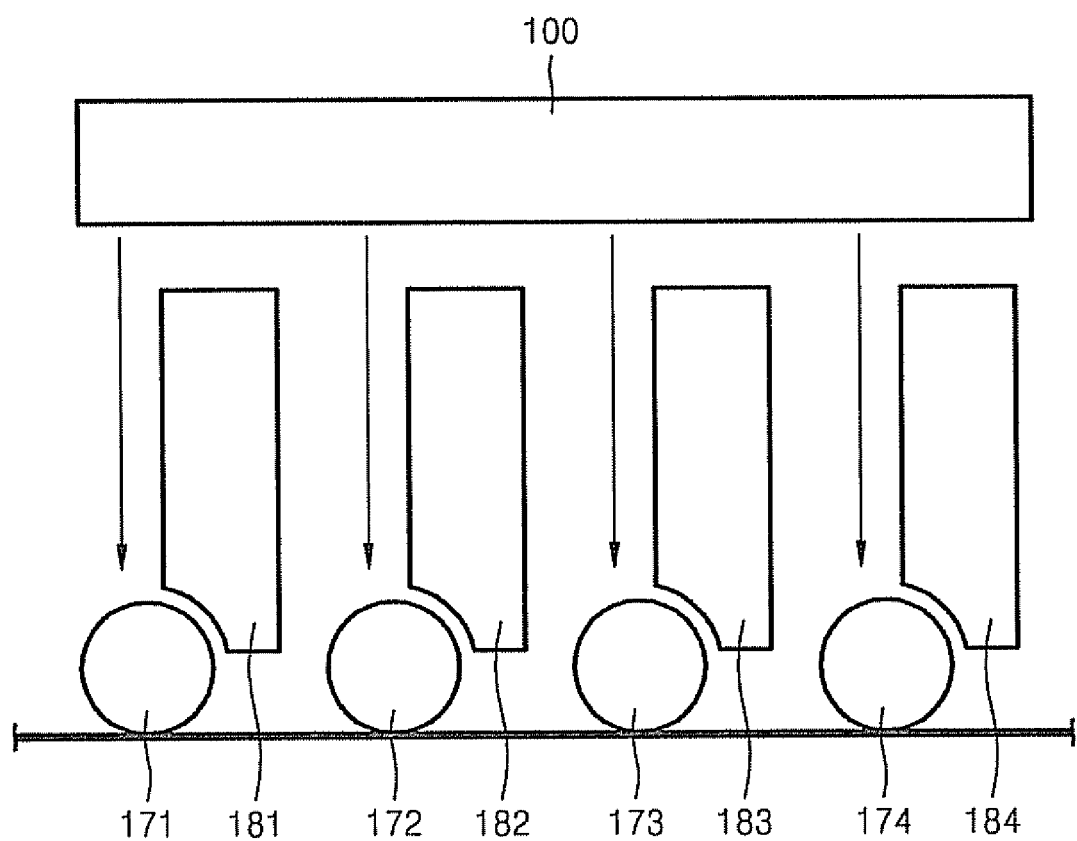
FIG. 11 illustrates an image forming apparatus according to an embodiment of the present invention.

FIG. 11 illustrates an image forming apparatus for forming a color image using a light scanning system 100 according to an embodiment of the present invention. Referring to FIG. 11, the image forming apparatus includes first through fourth photosensitive media 171, 172, 173, and 174, the light scanning system 100 to scan light onto the photosensitive media 171, 172, 173, and 174, first through fourth developing units 181, 182, 183, and 184 to develop an electrostatic latent image formed on each of the photosensitive media 171, 172, 173, and 174, and a transfer unit (not shown) to which a developed image is transferred. Light is emitted under on-off control by the light scanning system 100 to a deflector 115, 135, or 145. Then, the deflector 115, 135, or 145 scans the light onto the first through fourth photosensitive media 171, 172, 173, and 174 to form electrostatic latent images. The first through fourth developers 181, 182, 183, and 184 respectively correspond to the first through fourth photosensitive media 171, 172, 173, and 174. While not required, such a system can transfer black, magenta, yellow, and cyan ink, but is not limited thereto.

A developing agent is applied by the first through fourth developers 181, 182, 183, and 184 to the photosensitive media 171, 172, 173, and 174 to develop the electrostatic latent images. The developed electrostatic latent images are sequentially transferred to the transfer unit to form a color image. In other words, a first line transferred from the first photosensitive medium 171 to the transfer unit, a second line transferred from the second photosensitive medium 172 to the transfer unit, a third line transferred from the third photosensitive medium 173 to the transfer unit, and a fourth line transferred from the fourth photosensitive medium 174 to the transfer unit are sequentially superposed to form a color image and then are fixed to a print medium (such as paper).

As described above, according to aspects of the present invention, there is provided a light scanning system 100 and an image forming apparatus employing the same that improve scanning characteristics (such as field curvature deviations) by finding curvature radius conditions of the entrance surface and the exit surface of an f-θ lens and by making light obliquely incident on the plane perpendicular to the rotational axis of the deflector to minimize the thickness of the effective surface of the deflector. Accordingly, the light scanning system 100 according to aspects of the present invention improves the ease of assembly and mass production by disposing no reflective mirror in the optical path between the f-θ lens and the photosensitive medium to minimize the effect of the reflective mirror when the reflective mirror is moved to assemble the f-θ lens.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
   a photosensitive medium on which an electrostatic latent image is formed;
   a developing unit to develop the electrostatic latent image;
   a transfer unit to transfer the electrostatic latent image developed by the developing unit; and
   a light scanning system comprising:
      a plurality of light sources to emit light;
      a deflector shared by the plurality of light sources, the deflector being rotatable about a rotational axis to deflect the emitted light, the emitted light being obliquely incident on a plane perpendicular to the rotational axis;
      one or more f-θ lenses to focus the light deflected by the deflector onto the photosensitive medium, the one or more f-θ lenses being disposed in optical paths between the plurality of light sources and a plurality of photosensitive media corresponding to the light sources, each f-θ lens satisfying $-0.5 < R1/R2 < 0.2$, where R1 is a curvature radius of an entrance surface of the respective f-θ lens in a main-scanning direction and R2 is a curvature radius of an exit surface of the respective f-θ lens in the main-scanning direction; and
   a plurality of reflective mirrors to reflect the light, at least one reflective mirror being provided in an optical path between the deflector and each f-θ lens, and no reflective mirrors being provided in optical paths between the one or more f-θ lenses and the plurality of photosensitive media.

2. The image forming apparatus as claimed in claim 1, wherein the plurality of reflective mirrors comprises a first reflective mirror to reflect the deflected light and a second reflective mirror to reflect the light reflected by the first reflective mirror to one of the f-θ lenses.

3. The image forming apparatus as claimed in claim 2, wherein the light deflected by the deflector intersects with the light reflected by the second reflective mirror.

4. The image forming apparatus as claimed in claim 3, wherein the one f-θ lens is closer to the deflector than other ones of the f-θ lenses.

5. The image forming apparatus as claimed in claim 2, wherein the light deflected by the deflector does not intersect the light reflected by the second reflective mirror.

6. The image forming apparatus as claimed in claim 5, wherein the one f-θ lens is closer to the deflector than other ones of the f-θ lenses.

7. The image forming apparatus as claimed in claim 2, wherein the one f-θ lens to which the light is reflected by the second reflective mirror is closer to the deflector than other ones of the f-θ lenses.

8. The image forming apparatus as claimed in claim 1, wherein each f-θ lens has a field curvature of less than 1 mm in the main-scanning direction and a curvature of less than 1 mm in a sub-scanning direction.

9. The image forming apparatus as claimed in claim 1, wherein each f-θ lens has a magnification deviation of less than 1.5% in the main-scanning direction.

10. An image forming apparatus comprising:
   a photosensitive medium on which an electrostatic latent image is formed;
   a developing unit to develop the electrostatic latent image;
   a transfer unit to transfer the electrostatic latent image developed by the developing unit; and
   a light scanning system comprising:
      one or more light sources to emit light;
      a deflector rotatable about a rotational axis to deflect the emitted light, the emitted light being obliquely incident on a plane perpendicular to the rotational axis; and
      one or more f-θ lenses to focus the light deflected by the deflector onto the photosensitive medium, each f-θ lens satisfying −0.5<R1/R2<0.2,
      where R1 is a curvature radius of an entrance surface of the respective f-θ lens in a main-scanning direction and R2 is a curvature radius of an exit surface of the respective f-θ lens in the main-scanning direction,
      wherein each f-θ lens has an optical axis that is eccentric to an optical axis of the deflector.

11. A method of focusing light onto a photosensitive medium in a light scanning system, the method comprising:
   emitting light from a plurality of light sources;
   deflecting, with a deflector, the emitted light to one or more f-θ lenses, the emitted light being obliquely incident on a plane perpendicular to a rotational axis of the deflector;
   focusing the deflected light with the one or more f-θ lenses onto the photosensitive medium, the one or more f-θ lenses being respectively disposed in optical paths between the plurality of light sources and a plurality of photosensitive media corresponding to the light sources, each f-θ lens satisfying −0.5<R1/R2<0.2, where R1 is a curvature radius of an entrance surface of the respective f-θ lens in a main-scanning direction and R2 is a curvature radius of an exit surface of the respective f-θ lens in the main-scanning direction; and
   reflecting the deflected light with a plurality of reflective mirrors,
   wherein at least one reflective mirror is provided in an optical path between the plurality of light sources and each f-θ lens, and no reflective mirrors are provided in optical paths between the one or more f-θ lenses and the plurality of photosensitive media.

12. The method as claimed in claim 11, wherein the reflecting of the deflected light comprises:
   reflecting the deflected light with a first reflective mirror; and
   reflecting the light reflected by the first reflective mirror to one of the f-θ lenses.

* * * * *